United States Patent
Zusman et al.

(10) Patent No.: US 11,157,690 B2
(45) Date of Patent: Oct. 26, 2021

(54) TECHNIQUES FOR ASYNCHRONOUS EXECUTION OF COMPUTATIONALLY EXPENSIVE LOCAL SPREADSHEET TASKS

(71) Applicant: Microsoft Technology Licensing, LLC, Redmond, WA (US)

(72) Inventors: Dmitry Zusman, Redmond, WA (US); Aleksandr Malyshev, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/439,341

(22) Filed: Feb. 22, 2017

(65) Prior Publication Data
US 2018/0239749 A1    Aug. 23, 2018

(51) Int. Cl.
*G06F 40/18* (2020.01)
*G06F 9/48* (2006.01)

(52) U.S. Cl.
CPC ............ *G06F 40/18* (2020.01); *G06F 9/4843* (2013.01)

(58) Field of Classification Search
CPC .... G06F 17/246; G06F 3/0481; G06F 9/4843; G09F 9/4843
See application file for complete search history.

(56) References Cited

U.S. PATENT DOCUMENTS

| | | |
|---|---|---|
| 5,893,123 A | 4/1999 | Tuinenga |
| 6,460,059 B1 | 10/2002 | Wisniewski |
| 6,988,241 B1 | 1/2006 | Guttman et al. |
| 7,324,991 B1 | 1/2008 | Anjur |
| 7,908,549 B2 | 3/2011 | Khen et al. |
| 8,082,489 B2 | 12/2011 | Jiang |
| 8,190,987 B2 | 5/2012 | Campbell et al. |
| 8,250,117 B2 | 8/2012 | Olivieri et al. |

(Continued)

OTHER PUBLICATIONS

Pinola, Melanie, "Speed Up Excel by Turning Off Calculations (and Other Tricks)", http://lifehacker.com/5811745/speed-up-excel-by-turning-off-calculations-and-other-tricks, Published on: Jun. 14, 2011, 2 pages.

(Continued)

*Primary Examiner* — Stephen S Hong
*Assistant Examiner* — Nicholas Hasty

(57) ABSTRACT

The techniques described herein facilitate asynchronous execution of computationally expensive spreadsheet tasks and. In some embodiments, asynchronous calls to remote services for handling complex processing tasks such as, for example, complex calculations involving large data sets from one or more spreadsheets of a workbook are described. The handling can include generating a job including a data set from one or more spreadsheets and an instruction directing a remote service to asynchronously execute a computationally expensive spreadsheet task. Responsive to sending the remote service a request to perform the job, a persistent job identifier (ID) associated with the job is received by the spreadsheet application and embedded in (and/or otherwise associated with) at least one or more of the spreadsheets of the workbook. The job is then asynchronously executed by the remote service and the results are accessible from any client device having access to the workbook using the embedded or associated job ID.

20 Claims, 12 Drawing Sheets

(56) References Cited

U.S. PATENT DOCUMENTS

| | | |
|---|---|---|
| 8,370,770 B2 | 2/2013 | Vance et al. |
| 8,447,886 B2 | 5/2013 | Rochelle et al. |
| 8,527,865 B2 | 9/2013 | Li et al. |
| 8,584,004 B2* | 11/2013 | Rae .................. G06Q 40/04 |
| | | 715/219 |
| 8,626,477 B2 | 1/2014 | Oh |
| 8,627,120 B2 | 1/2014 | Conway |
| 9,389,891 B2 | 7/2016 | Battagin et al. |
| 9,794,328 B1 | 10/2017 | Corley et al. |
| 10,013,412 B2 | 7/2018 | McKenzie et al. |
| 10,311,105 B2 | 6/2019 | Nice et al. |
| 10,366,102 B2 | 7/2019 | Dageville et al. |
| 10,540,330 B1 | 1/2020 | Tiwari et al. |
| 2004/0181748 A1 | 9/2004 | Jamshidi et al. |
| 2006/0036939 A1* | 2/2006 | Hobbs .................. G06F 17/246 |
| | | 715/213 |
| 2006/0080594 A1 | 4/2006 | Chavoustie et al. |
| 2008/0027920 A1* | 1/2008 | Schipunov ......... G06F 16/2471 |
| 2009/0006939 A1* | 1/2009 | DeSpain ............. G06F 17/246 |
| | | 715/217 |
| 2010/0057831 A1 | 3/2010 | Williamson |
| 2010/0306128 A1 | 12/2010 | Moffat et al. |
| 2010/0333104 A1* | 12/2010 | Unnikrishnan ......... G06F 9/505 |
| | | 718/105 |
| 2013/0073940 A1 | 3/2013 | Honsowetz |
| 2013/0151938 A1 | 6/2013 | Waldman et al. |
| 2013/0179764 A1* | 7/2013 | Battagin ............. G06F 9/45529 |
| | | 715/209 |
| 2013/0254644 A1 | 9/2013 | Rochelle et al. |
| 2014/0172955 A1 | 6/2014 | Holla et al. |
| 2014/0244707 A1 | 8/2014 | Kluin et al. |
| 2015/0199326 A1 | 7/2015 | Danziger et al. |
| 2015/0269273 A1* | 9/2015 | Vorne ................ H04L 29/08846 |
| | | 715/234 |
| 2017/0177173 A1 | 6/2017 | Doms |
| 2018/0239617 A1 | 8/2018 | Zusman et al. |

OTHER PUBLICATIONS

"Excel 2010 Performance: Performance and Limit Improvements", https://msdn.microsoft.com/en-us/library/office/ff700514(v=office.14).aspx, Published on: Nov. 12, 2012, 5 pages.

"A Better Calculation Engine: Leveraging Excel Logic for Server Side Calculations", In White Paper, Nov. 3, 2005, 5 pages.

"Analyzing Big SQL data in a client spreadsheet application", http://www.ibm.com/support/knowledgecenter/SSPT3X_2.1.2/com.ibm.swg.im.infosphere.biginsights.tut.doc/doc/tut_less_bigsql_excel.html, Retrieved on: Dec. 8, 2016, 3 pages.

"Non Final Office Action Issued in U.S. Appl. No. 15/439,452", dated Feb. 26, 2019, 8 Pages.

"Final Office Action Issued in U.S. Appl. No. 15/439,452", dated Nov. 8, 2019, 9 Pages.

"Notice of Allowance Issued in U.S. Appl. No. 15/439,452", dated Mar. 18, 2020, 6 Pages.

* cited by examiner

TECHNIQUES FOR ASYNCHRONOUS EXECUTION OF COMPUTATIONALLY EXPENSIVE LOCAL SPREADSHEET TASKS

CROSS-REFERENCE TO RELATED APPLICATIONS

This application is related to co-pending U.S. patent application Ser. No. 15/439,452, entitled "BIG DATA PIPELINE MANAGEMENT WITHIN SPREADSHEET APPLICATIONS," which was filed on the same day as this application, the contents of which are expressly incorporated by reference herein.

BACKGROUND

Spreadsheet applications such as, for example, Microsoft Excel®, are widely used in many fields and are increasingly important for analyzing data in today's business environments. For example, data analysts regularly use client-side spreadsheet applications as their primary tool for performing computationally expensive spreadsheet tasks including, but not limited to, consolidating and massaging data, producing charts, performing complex calculations, and the like.

Unfortunately, as the spreadsheet tasks become increasingly complex, and as the amount of data grows, the calculations become increasing expensive to execute in terms of calculation time, power consumption, and rendering for user observation. Moreover, the client-side spreadsheet applications are often limited in that the spreadsheet tasks must be performed synchronously which results in a variety of inefficiencies including exceedingly long wait times, lost calculation data, timeouts, etc., among other inefficiencies.

Overall, the examples herein of some prior or related systems and their associated limitations are intended to be illustrative and not exclusive. Upon reading the following, other limitations of existing or prior systems will become apparent to those of skill in the art.

OVERVIEW

Examples discussed herein relate to directing remote services to asynchronously execute computationally expensive spreadsheet tasks from a spreadsheet application, e.g., Microsoft Excel®. In an implementation, a method of operating a spreadsheet application for directing a remote service to asynchronously execute computationally expensive spreadsheet tasks is disclosed. The method includes generating a job including data from one or more spreadsheets and an instruction directing the remote service to asynchronously execute a computationally expensive spreadsheet task. The method further includes sending the request to perform the job for delivery to the remote service and, responsive to sending the request, receiving a persistent job identifier (ID) associated with the job from the remote service. Once received, the method includes embedding the job ID in at least one of the one or more spreadsheets for subsequently accessing results of the computationally expensive spreadsheet task.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION

Figure 1:
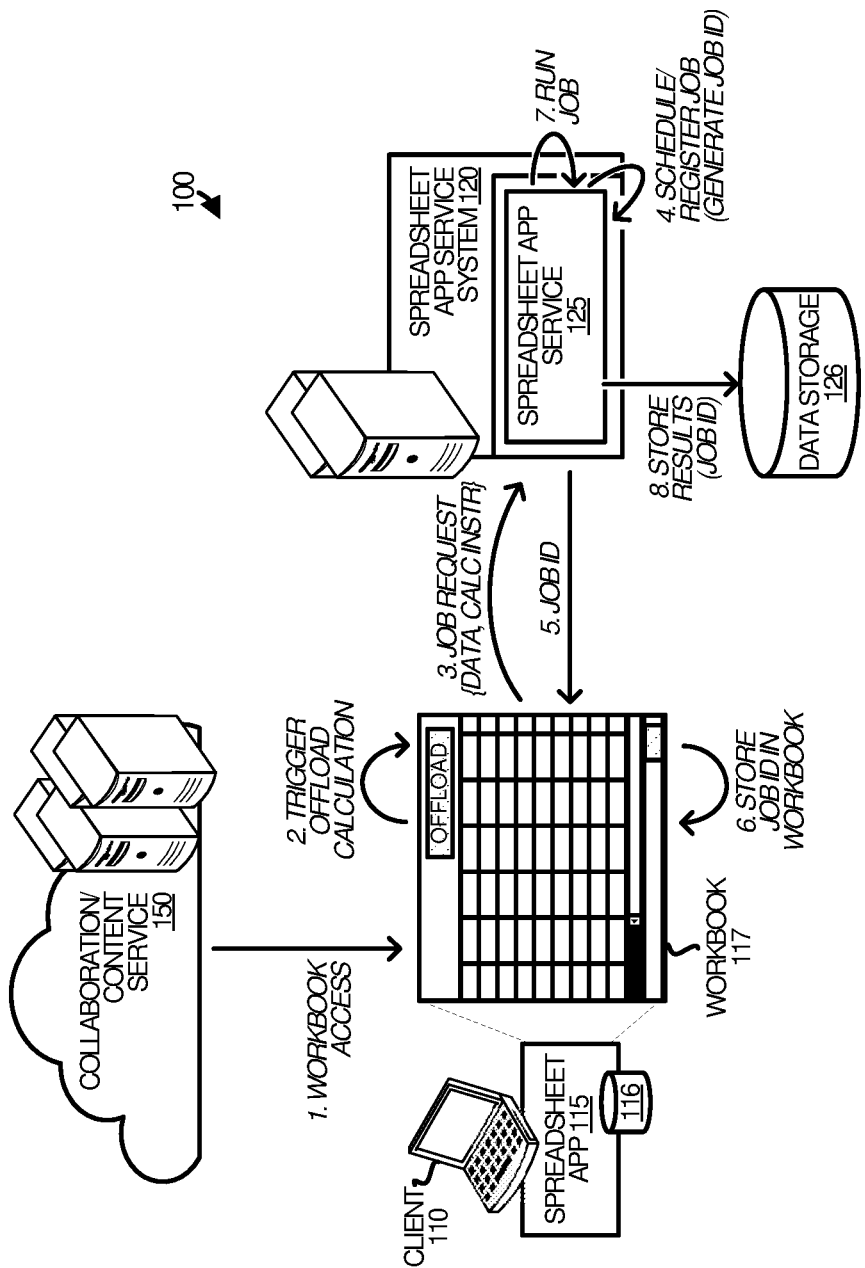
FIG. 1 depicts a block diagram illustrating an example operational architecture for asynchronously directing a spreadsheet application service to execute computationally expensive spreadsheet tasks, according to some embodiments.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or a computer readable medium.

Techniques are described for asynchronously executing computationally expensive spreadsheet tasks. More specifically, the techniques describe asynchronous calls to remote services for handling complex processing tasks such as, for example, complex calculations involving large data sets of one or more spreadsheets of a workbook. Among other operations, the handling can include generating a job including a data set from one or more spreadsheets and an instruction directing a remote service to asynchronously execute a computationally expensive spreadsheet task. Responsive to sending the remote service a request to perform the job, a persistent job identifier (ID) associated with the job is received by the spreadsheet application and embedded in (and/or otherwise associated with) at least one or more of the spreadsheets of the workbook. The job is then asynchronously executed by the remote service and the results are accessible from any client device or spreadsheet app having access to the workbook using the embedded or associated job ID.

At least one technical effect enabled by the techniques discussed herein is the ability for a user to open a workbook and initiate the remote processing feature on one client device and continue to work or consume the results—at a later time—using the same or a different client device. In this manner, the client devices can kickoff computationally expensive spreadsheet tasks without concern for synchronicity, e.g., calculation time, timeouts, etc. Advantageously, the calculation and resulting visualization thereof are asynchronous.

In some embodiments, the techniques described herein are embodied in an extension such as, for example, a Microsoft Excel® software extension. Among other functions, the extension can be configured to offload complex and/or time expensive processing tasks. Additionally, the extension can be configured to integrate results of the processing task in a client-dependent way, e.g., results can be paged and observed in a manner suitable for desktop, mobile or other clients.

In some embodiments, a spreadsheet application (or extension thereof) can divide the processing of a complex calculation or spreadsheet task between the local spreadsheet application running on the client device and a remote spreadsheet application service. Similarly, a spreadsheet application (or extension thereof) running on a client device can delay complex calculations or spreadsheet tasks based on a variety of inputs, e.g., low battery conditions of the client device, etc.

FIG. 1 depicts a block diagram illustrating an example operational architecture 100 for asynchronously directing a spreadsheet application (app) service 125 to execute computationally expensive spreadsheet tasks, according to some embodiments. The example operational architecture 100 includes a client device 110, a spreadsheet application service system 120 including data storage 126, and a content service 150. As shown in the example of FIG. 1, the spreadsheet application service system 120 executes a spreadsheet app service 125.

Figure 10:
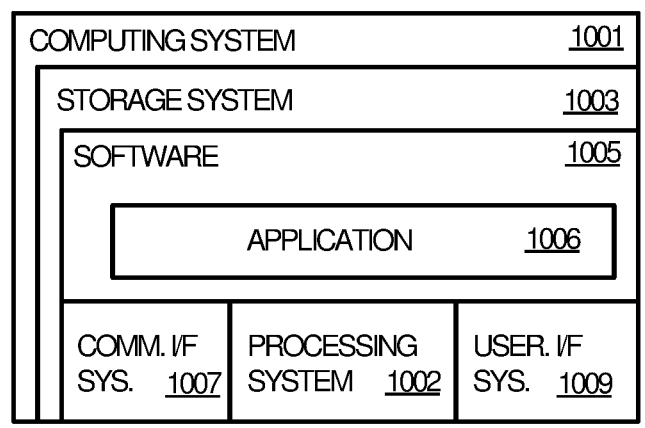
FIG. 10 is a block diagram illustrating a computing system suitable for implementing the electronic calendar sharing technology disclosed herein, including any of the applications, architectures, elements, processes, and operational scenarios and sequences illustrated in the Figures and discussed below in the Technical Disclosure.

In operation, client device 110 runs a spreadsheet application 115 that, at step 1, accesses a workbook 117 from a collaboration or content service 150. The collaboration or content service 150 is representative of any service providing shared access to cloud-based or centralized content and centralized storage for workbooks such as, for example, Microsoft® SharePoint® Online (SPO) services, SharePoint®, a shared network drive, or the like. As shown in the example of FIG. 1, workbook 117 is opened on client device 110 with spreadsheet app 115. The spreadsheet app 115 can include functionality including GUIs (graphical user interface) running on client 110, e.g., a PC, mobile phone device, a Web server, or other application servers. Such systems may employ one or more virtual machines, containers, or any other type of virtual computing resource in the context of supporting the offloading of computationally expensive spreadsheet tasks of which computing system 1001 of FIG. 10 is representative.

Once a computationally expensive spreadsheet task is identified, at step 2, the task can be offloaded. In some embodiments, the computationally expensive spreadsheet tasks are automatically identified by the spreadsheet application. For example, the system can estimate an amount of time that a given spreadsheet task will take to execute locally and notify the user about the ability to asynchronously offload the task. Alternatively or additionally, a user may manually trigger the offloading if the user is aware that a spreadsheet task will be computationally expensive or if the user simply wishes to kick off the spreadsheet task and view the results at a later time.

Responsive to triggering an offloading request of the spreadsheet task, the spreadsheet app 115 generates a job including the data set from workbook 117, e.g., one or more spreadsheets of the workbook, and an instruction directing the spreadsheet app (or remote) service to asynchronously execute the computationally expensive spreadsheet task. At step 3, the spreadsheet app sends a request to perform the job to the spreadsheet app service 125 running on the spreadsheet application service system 120. The spreadsheet application service system 120 may include server computers, blade servers, rack servers, and any other type of computing system (or collection thereof) suitable for executing the spreadsheet app service 125 and/or otherwise carrying out the operations discussed herein. Such systems may employ one or more virtual machines, containers, or any other type of virtual computing resource in the context of supporting execution of offloaded computationally expensive spreadsheet tasks of which computing system 1001 of FIG. 10 is representative.

The spreadsheet app service 125 receives the job request and, at step 4, schedules or registers the job request with a job registry component of the spreadsheet application service. In some embodiments, registering the job request with the job registry component includes generating a job ID that is persistently associated with the job or the job request. At step 5, the spreadsheet app service 125 provides the persistent job ID to spreadsheet application 115 which, at step 6, in turn, stores the job ID in workbook 117. For example, the spreadsheet application 115 or an extension thereof may store or embed the job ID in one or more spreadsheets of workbook 117. At step 7, the spreadsheet app service 125 executes (or runs) the job and, at step 8, stores or persists the results in data storage 126.

Figure 2:
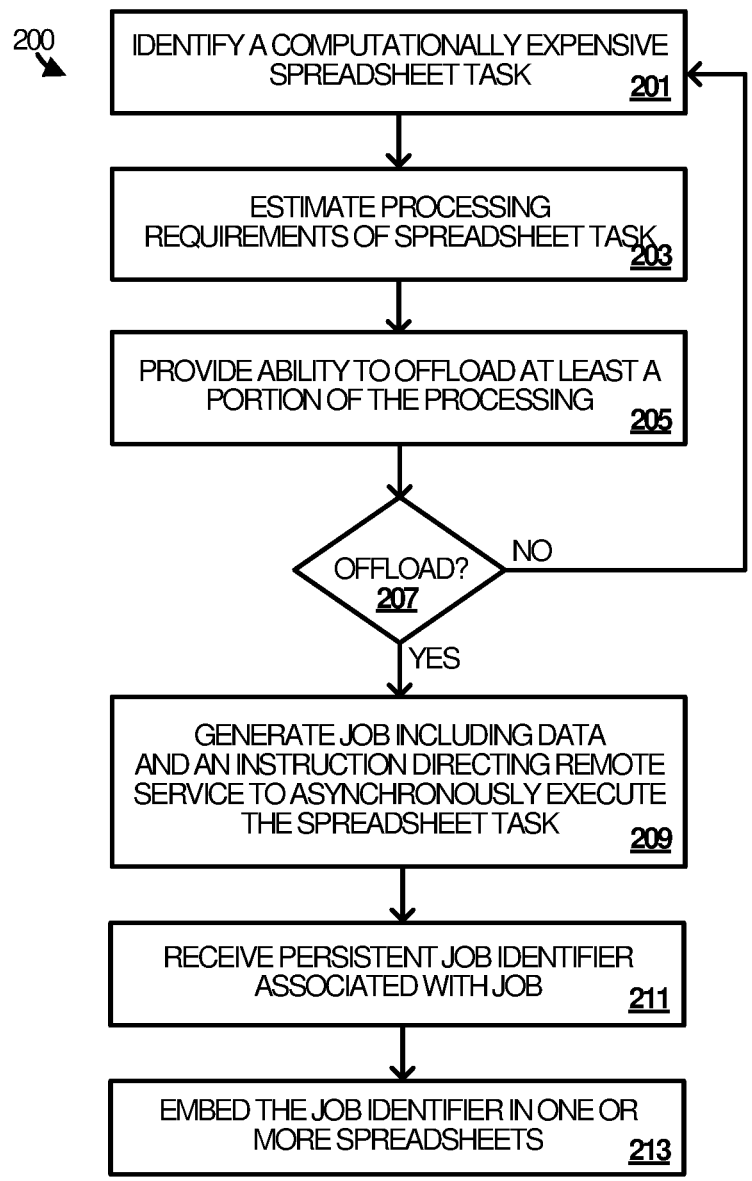
FIG. 2 depicts a flow diagram illustrating example operations of a spreadsheet application for directing a remote service to asynchronously execute a computationally expensive spreadsheet task, according to some embodiments.

FIG. 2 depicts a flow diagram illustrating example operations 200 of a spreadsheet application for directing a remote service to asynchronously execute a computationally expensive spreadsheet task, according to some embodiments. The example operations 200 may be performed in various embodiments by a spreadsheet app such as, for example, spreadsheet app 115 of FIG. 1, or one or more processors, extensions, modules, engines, components or tools associated therewith.

To begin, at 201, the spreadsheet application identifies a computationally expensive spreadsheet task. In some embodiments, the spreadsheet application can automatically identify a computationally expensive spreadsheet task and notify a user, e.g., via a GUI, regarding the same. At 203, the spreadsheet application estimates processing requirements associated with executing the computationally expensive spreadsheet task and, at 205, provides the ability, e.g., to a user of the spreadsheet application, to offload at least a portion of the processing requirements to the remote service, e.g., spreadsheet app service 125. In some instances, an offload button or indicator may be provided via a GUI or extension of the spreadsheet application to trigger offloading of some or all the processing requirements associated with executing the computationally expensive spreadsheet task.

In some embodiments, estimating the processing requirements can include estimating an amount of time required to execute the computationally expensive spreadsheet task. The spreadsheet application can also divide the processing requirements among the client, e.g., client 110, running the spreadsheet application and the remote service, e.g., spreadsheet app service 125. For example, calculations requiring extensive time to execute can be offloaded. At decision 207, the spreadsheet application decides whether to offload the computationally expensive spreadsheet task. As discussed herein, the decision can occur as a result of a manual user operation, e.g., directing the spreadsheet app to offload a computationally expensive spreadsheet task or automatically as a result of some other condition, e.g., low battery life of client 110, etc.

If the computationally expensive spreadsheet task is to be offloaded, at 209, the spreadsheet application generates a job including data from one or more spreadsheets, e.g., of workbook 117, and an instruction directing the remote service e.g., spreadsheet app service 125, to asynchronously execute the computationally expensive spreadsheet task. As discussed above, the remote service schedules the job, generates a job ID that is persistently associated with the job, and sends the job ID to the spreadsheet application. At 211, the spreadsheet application receives the persistent job ID and, at 213, embeds or stores the job id in the one or more spreadsheets, e.g., of workbook 117.

Figure 3:
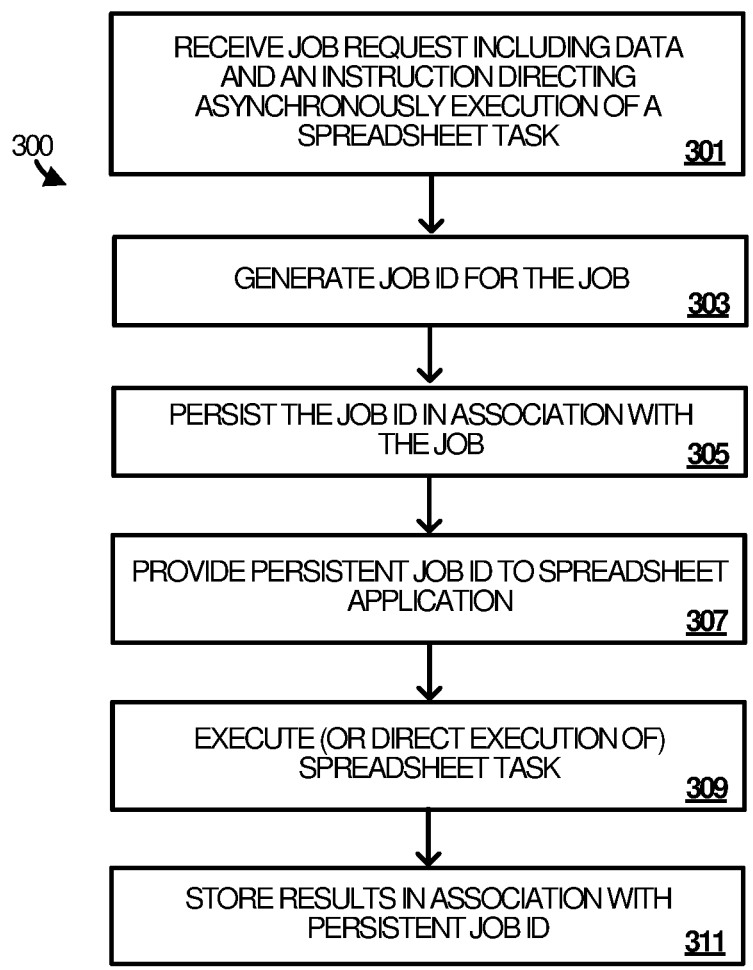
FIG. 3 depicts a flow diagram illustrating example operations of a spreadsheet application service for asynchronously executing a computationally expensive spreadsheet task offloaded by a remote spreadsheet application, according to some embodiments.

FIG. 3 depicts a flow diagram illustrating example operations 300 of a spreadsheet application service for asynchronously executing a computationally expensive spreadsheet task offloaded by a remote spreadsheet application, according to some embodiments. The example operations 300 may be performed in various embodiments by a spreadsheet app service such as, for example, spreadsheet app service 162 of FIG. 1, or one or more processors, extensions, modules, engines, components or tools.

To begin, at 301, the spreadsheet application service receives a job request including an instruction directing asynchronous execution of a computationally expensive spreadsheet task. At 303, the spreadsheet application service generates a job ID for the job and, at 305, persists the job ID in association with the job. At 307, the spreadsheet app service provides the persistent job ID to the spreadsheet application.

At 309, the spreadsheet app service executes the computationally expensive spreadsheet task or directs a distributed computing framework to execute the computationally expensive spreadsheet task. The distributed computing framework can be any system or couple of systems capable of executing the computationally expensive spreadsheet task given associated data from the one or more spreadsheets. An example of a distributed computing framework executing a computationally expensive spreadsheet task is shown and discussed in greater detail with reference to FIG. 9. Lastly, at 311, the spreadsheet application service stores or persists the results of the computationally expensive spreadsheet task in association with the job ID.

Figure 4A:
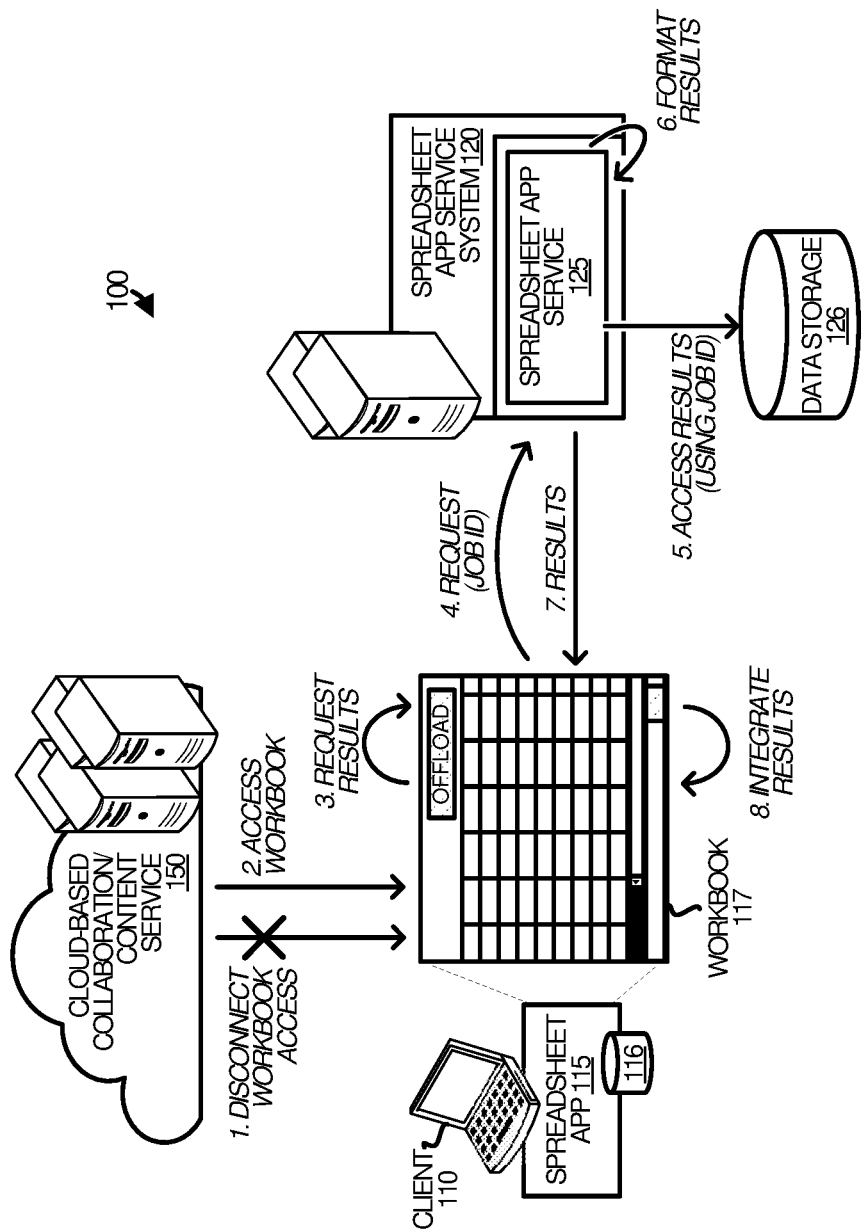
FIGS. 4A-4C depict block diagrams illustrating example operational architectures for requesting results of a computationally expensive spreadsheet task from various spreadsheet applications, according to some embodiments.
Figure 4B:
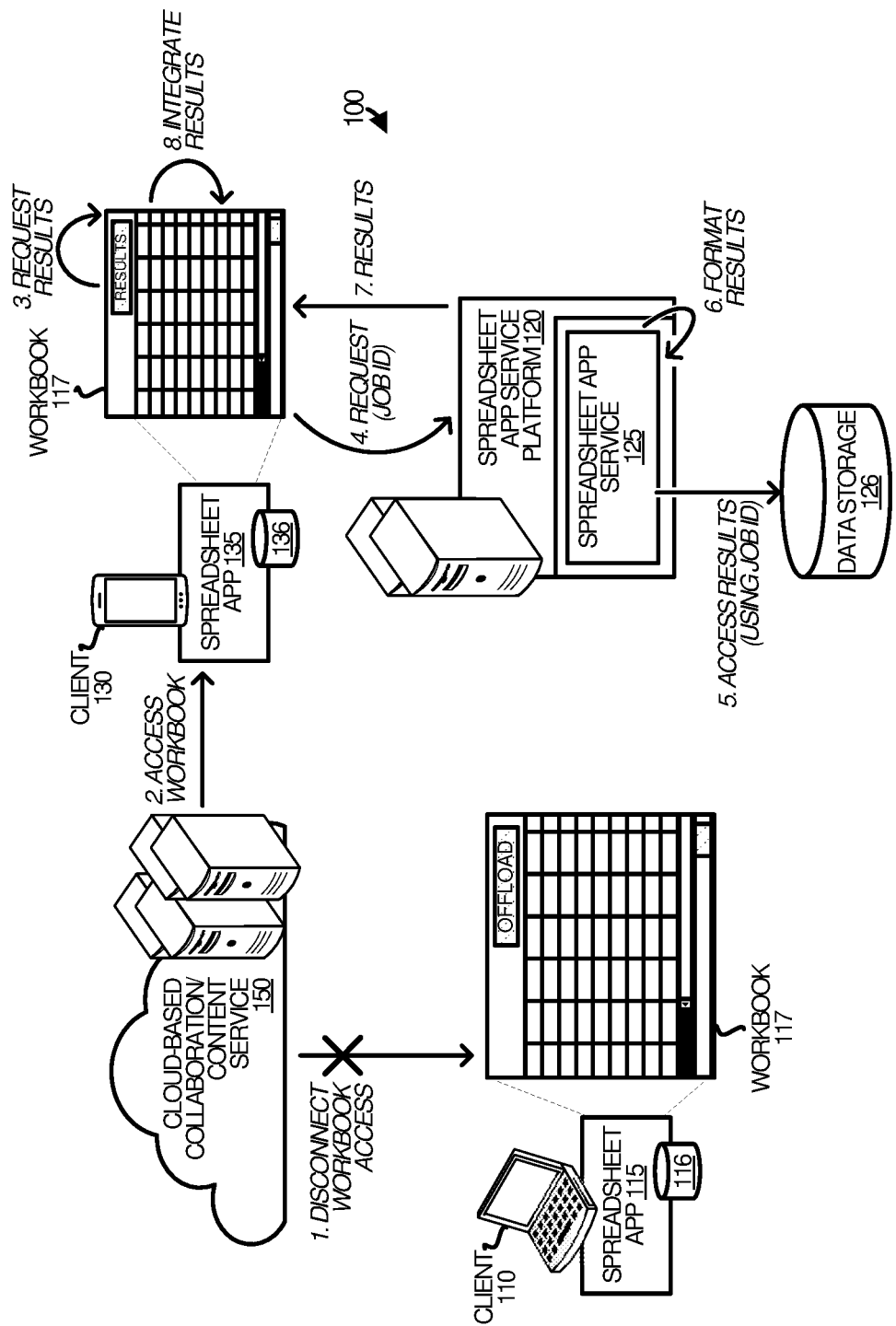
Figure 4C:
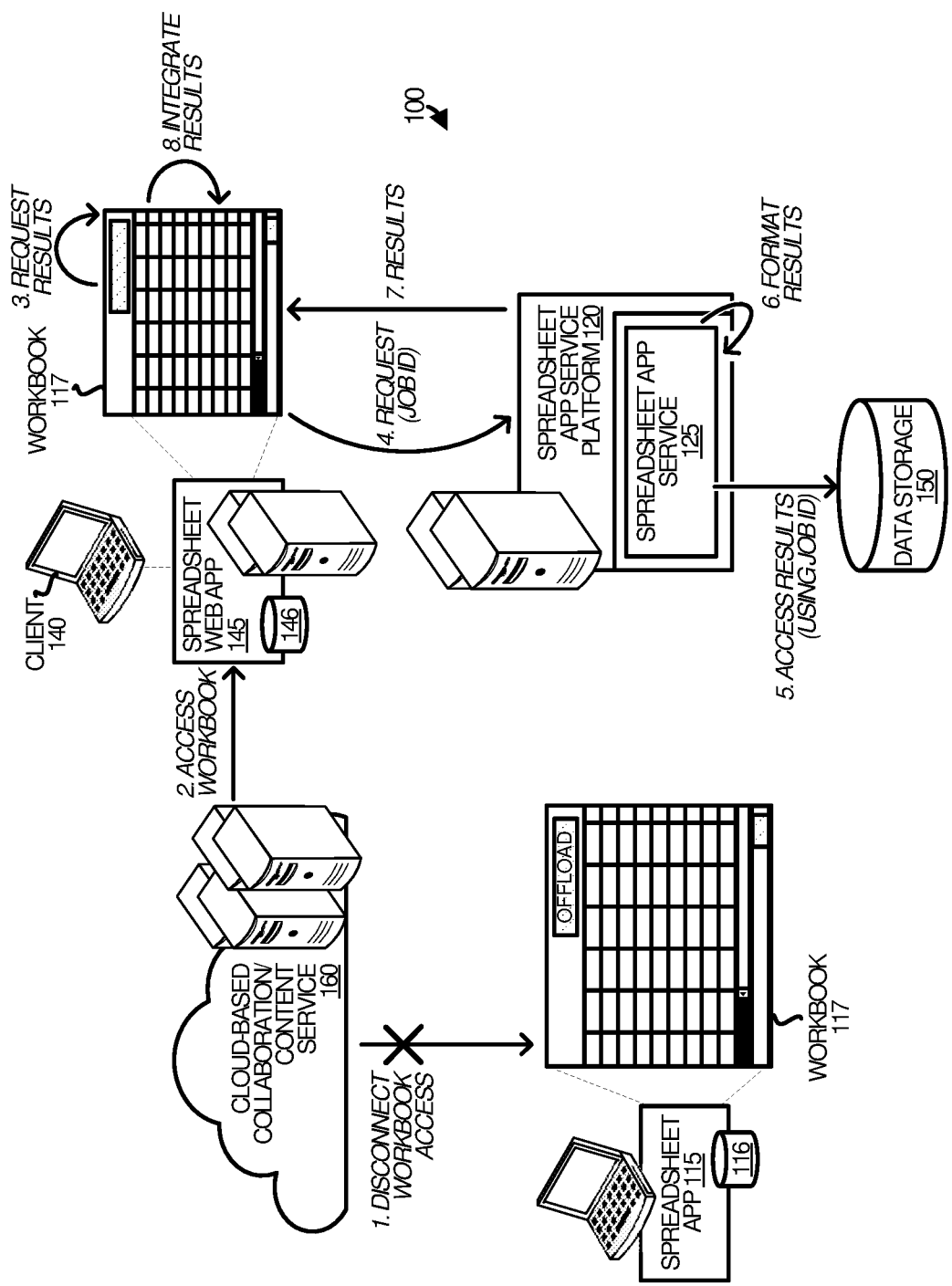

FIGS. 4A-4C depict block diagrams illustrating example operational architectures 400A-400C for requesting results of a computationally expensive spreadsheet task from various spreadsheet applications, according to some embodiments. Example operational architectures 400A-400C are similar to example operational architecture 100 of FIG. 1 and include many of the same components. More specifically, example operational architectures 400A-400C provide a continuation of operations after a job ID has been stored in workbook 117, as shown and discussed with respect to FIG. 1.

Initially, the example operational architectures 400A-400C illustrate disconnecting workbook access to workbook 117 after offloading a computationally expensive spreadsheet task and subsequently requesting results of the task via various spreadsheet apps, including the same spreadsheet app 115 (FIG. 4A), a mobile spreadsheet app 135 (FIG. 4B), and a spreadsheet web app 145 (FIG. 4C). As discussed herein, any user with access to workbook 117 can offload a computationally expensive spreadsheet task, shutdown a spreadsheet application and subsequently access the results from the same or a different spreadsheet application. Likewise, a different user with access to workbook 117 can access the results from the same or a different spreadsheet application.

Referring first to FIG. 4A, initially, client device 110 runs a spreadsheet application 115 that accesses a workbook 117 from a collaboration or content service 150. As shown in the example of FIG. 1, workbook 117 is initially opened on client device 110 with spreadsheet app 115 and a computationally expensive spreadsheet task is offloaded.

At step 1, access to workbook 117 is disconnected. At step 2, a user of client 110 subsequently accesses workbook 117 again from spreadsheet app 115 running on client 110. The spreadsheet app 115 can monitor and/or otherwise receive status updates regarding execution of the computationally expensive spreadsheet task as shown and discussed in greater detail with reference to FIG. 7. At step 3, spreadsheet app 115 can generate and send a request for results of the computationally expensive spreadsheet task. The request includes the persistent job ID which can be extracted and/or otherwise obtained from workbook 117—where it was previously embedded. Although the example of FIG. 4A illustrates disconnection and reconnection, it is appreciated that spreadsheet app 115 can maintain the connection to workbook 117 and subsequently request results once available.

The spreadsheet app service 125 receives the request and, at step 5, accesses the results from a data storage system or database 126. At step 6, the spreadsheet app service 125 formats the results. As discussed in greater detail with reference to FIG. 6, the type of client requesting the results or the type of spreadsheet application requesting the results can be identified based on the request. For example, the request can include an indication that the request is coming from a desktop, mobile or web application. The spreadsheet app service 125 can format the results based on the type of client requesting the results (or the type of spreadsheet application requesting the results). In some embodiments, formatting the results can include paging the results of the computationally expensive spreadsheet task, e.g., for a mobile spreadsheet app.

The spreadsheet app service 125, at step 7, provides the results of the computationally expensive spreadsheet task to the requesting spreadsheet application and, at step 8, the results are integrated into the workbook 117.

FIG. 4B is similar to the example of FIG. 4A, initially, client device 110 runs a spreadsheet application 115 that accesses a workbook 117 from a collaboration or content service 150 and a computationally expensive spreadsheet task is offloaded. At step 2, a user of mobile client 130 subsequently accesses workbook 117 from a mobile spreadsheet app 135 running on mobile client 130. The mobile spreadsheet app 135 can monitor and/or otherwise receive status updates regarding execution of the computationally expensive spreadsheet task as shown and discussed in greater detail with reference to FIG. 7. At step 3, the mobile spreadsheet app 135 can generate and send a request for results of the computationally expensive spreadsheet task. The request includes the persistent job ID which can be extracted and/or otherwise obtained from workbook 117—where it was previously embedded. Although the example of FIG. 4B illustrates disconnection of workbook 117, it is appreciated that spreadsheet app 115 can maintain the connection to workbook 117 concurrently with mobile spreadsheet app 135.

FIG. 4C is similar to the examples of FIGS. 4A-4B, initially, client device 110 runs a spreadsheet web app 145 that accesses a workbook 117 from a collaboration or content service 150 and a computationally expensive spreadsheet task is offloaded. At step 2, a user of client 140 subsequently accesses workbook 117 from spreadsheet web app 145. The spreadsheet web app 145 can monitor and/or otherwise receive status updates regarding execution of the computationally expensive spreadsheet task as shown and discussed in greater detail with reference to FIG. 7. At step 3, the spreadsheet web app 145 can generate and send a request for results of the computationally expensive spreadsheet task. The request includes the persistent job ID which can be extracted and/or otherwise obtained from workbook 117—where it was previously embedded. Although the example of FIG. 4C illustrates disconnection of workbook 117, it is appreciated that spreadsheet app 115 can maintain the connection to workbook 117 concurrently with mobile spreadsheet app 135.

Figure 5:
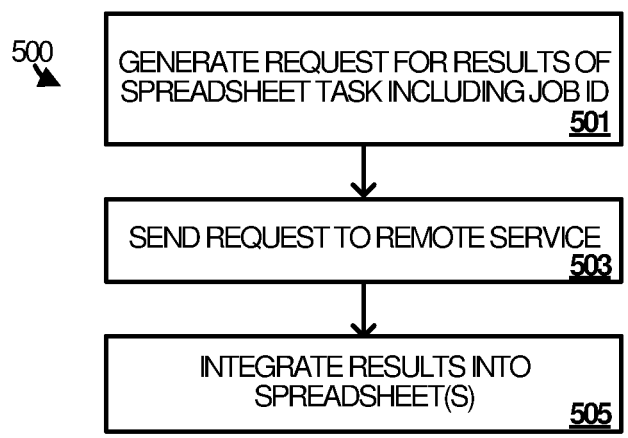
FIG. 5 depicts a flow diagram illustrating example operations of a spreadsheet application for requesting results of an offloaded computationally expensive spreadsheet task, according to some embodiments.

FIG. 5 depicts a flow diagram illustrating example operations 500 of a spreadsheet application for requesting results of an offloaded computationally expensive spreadsheet task, according to some embodiments. The example operations 500 may be performed in various embodiments by a spreadsheet app such as, for example, spreadsheet app 115 of FIG. 1, or one or more processors, extensions, modules, engines, components or tools associated therewith.

To begin, at 501, the spreadsheet application generates a request for results of the computationally expensive spreadsheet task. As discussed herein, the request for the results includes a job ID. At 503, the spreadsheet application sends the request for results to the remote service, e.g., spreadsheet app service 125. Lastly, at 505, the spreadsheet application integrates the results into one or more spreadsheet of the workbook, e.g., workbook 117.

Figure 6:
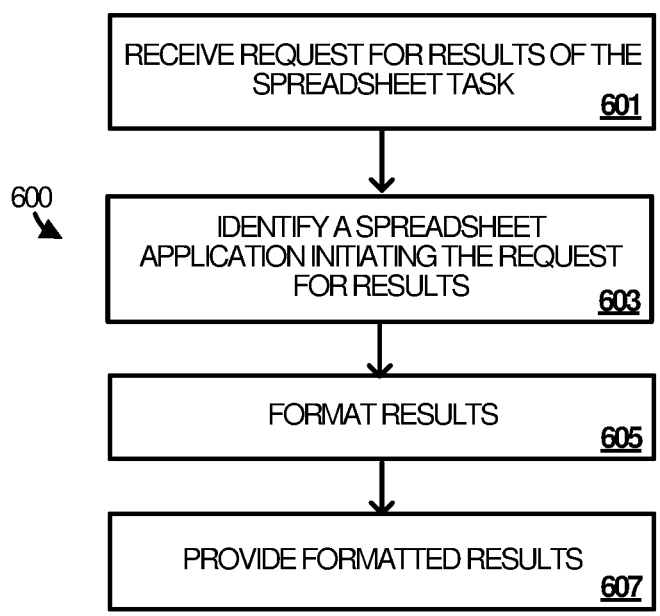
FIG. 6 depicts a flow diagram illustrating example operations of a spreadsheet application service for providing results of an offloaded computationally expensive spreadsheet task, according to some embodiments.

FIG. 6 depicts a flow diagram illustrating example operations 600 of a spreadsheet application service for providing results of an offloaded computationally expensive spreadsheet task, according to some embodiments. The example operations 600 may be performed in various embodiments by a spreadsheet app service such as, for example, spreadsheet app service 162 of FIG. 1, or one or more processors, extensions, modules, engines, components or tools.

To begin, at 601, the spreadsheet application service receives a request for results of the computationally expensive spreadsheet task initiated by a requesting spreadsheet application. As discussed herein, the request includes the job ID provided by the spreadsheet application service when the computationally expensive spreadsheet task is offloaded by a spreadsheet application.

At 603, the spreadsheet application service identifies a spreadsheet application initiating the request for results. In some embodiments, a type of the spreadsheet application is also identified. For example, the request can include an indication that the request is coming from a desktop, mobile or web application. At 605, the spreadsheet application service formats the results of computationally expensive spreadsheet task. In some embodiments, the results are formatted based on the type of the requesting spreadsheet application, e.g., the results of the computationally expensive spreadsheet task can be paged when the requesting spreadsheet application comprises a mobile spreadsheet app.

Figure 7:
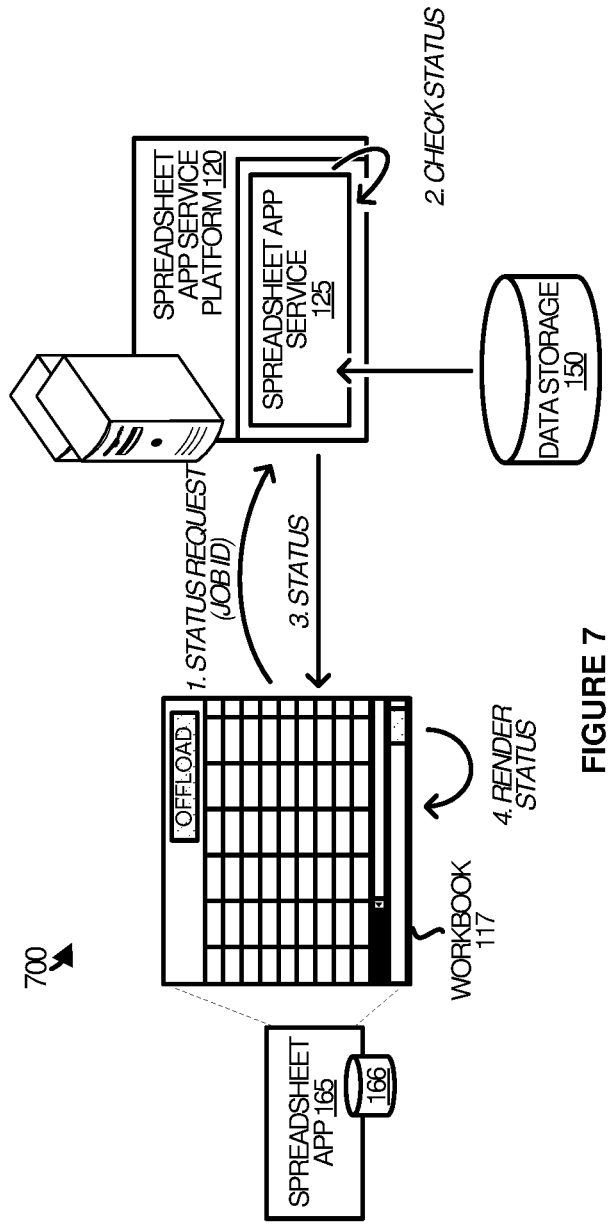
FIG. 7 depicts a block diagram illustrating an example operational architecture for requesting a status of a computationally expensive spreadsheet task from a spreadsheet application, according to some embodiments.

FIG. 7 depicts a block diagram illustrating an example operational architecture 700 for requesting a status of a computationally expensive spreadsheet task from a spreadsheet app 165, according to some embodiments. The example operation architecture 700 is similar to example operational architecture 100 of FIG. 1 and includes many of the same components. The spreadsheet app 165 can be spreadsheet app 115 of FIG. 4A, mobile spreadsheet app 135 of FIG. 4B, or spreadsheet web app 145 of FIG. 4C, although alternative configurations are possible.

Initially, at step 1, the spreadsheet app 165 generates and sends a request for status of the computationally expensive spreadsheet task. As shown in the example of FIG. 7, the request includes the persistent job ID which can be extracted and/or otherwise obtained from workbook 117—where it was previously embedded as discussed with reference to FIG. 1. Although the example of FIG. 7 illustrates generating and sending a status request, in some embodiments, it is appreciated that the spreadsheet app service 125 periodically sends status updates without requests, e.g., periodically, based on triggering events, etc.

At step 2, responsive to receiving the status request, the spreadsheet app service 125 checks status of execution of the computationally expensive spreadsheet task and, at step 3, sends the status to the spreadsheet app 165. Lastly, at step 4, the spreadsheet app 165 renders the status of execution of the computationally expensive spreadsheet task in one or more spreadsheets of workbook 117. As discussed herein, the status can be rendered in a graphical user interface. Example graphical user interfaces are shown and discussed in greater detail wither reference to FIG. 8.

Figure 8:
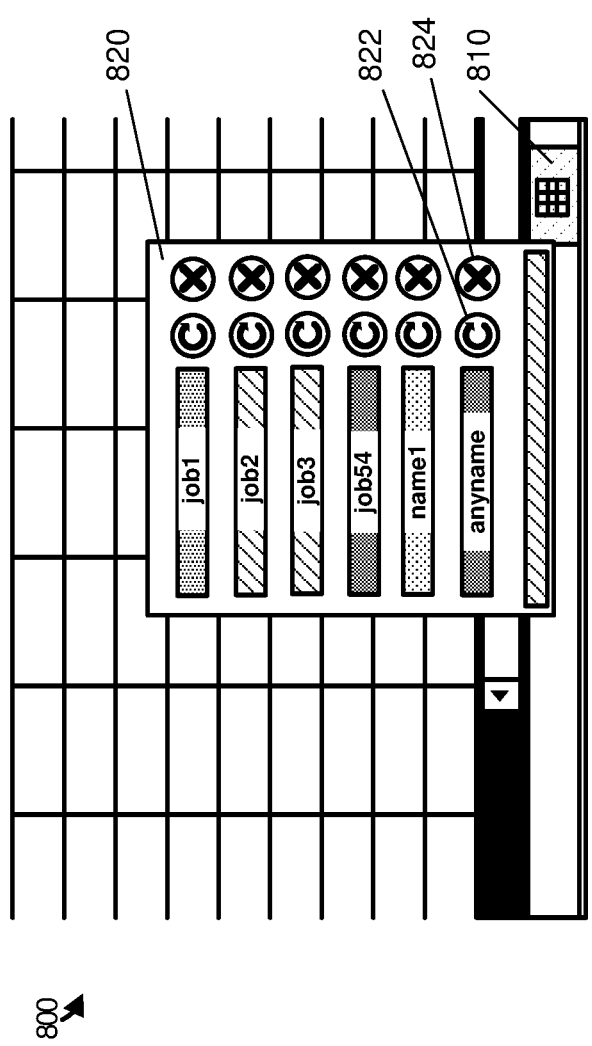
FIG. 8 depicts an example graphical user interface for rendering status of multiple offloaded computationally expensive spreadsheet tasks, according to some embodiments.

FIG. 8 depicts an example graphical user interface 800 for rendering status of multiple offloaded computationally expensive spreadsheet tasks, according to some embodiments. The example graphical user interface can include a progress area or bar 810. If the progress area or bar 810 is clicked, selected, hovered over, or otherwise selected, then a status pane 820 can be rendered. The status pane 820 illustrates a progress of various jobs (or computationally expensive spreadsheet tasks) that have been offloaded. In some embodiments, the status of each job is shown on a bar with temperature results which can indicate whether the job is finished or the status of the job. In some embodiments, the status of the job can be indicated by a color scheme. For example, a color can indicate how close a job is to being completed, e.g., from orange to green, where green indicates completion of the job and red can indicate that a job has failed.

Additional buttons 822 and 824 are provided to restart a job and cancel or remove results for a finished job, respectively. In some embodiments, once a job is completed, a user can click on or otherwise select the status bar associated with a job and drag it to a place in the workbook, e.g., one or more cells, where the user would like the results rendered.

Figure 9:
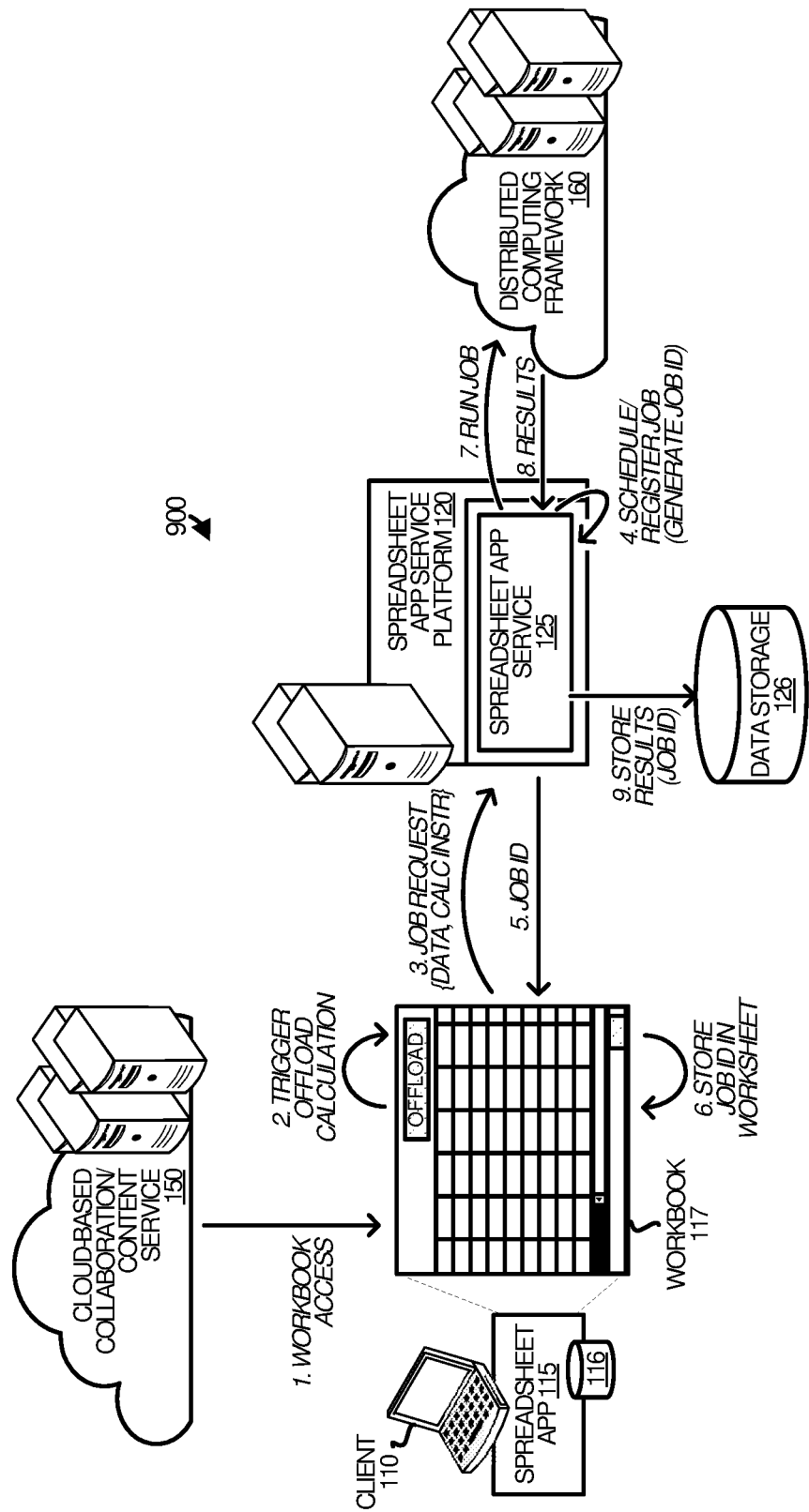
FIG. 9 depicts a block diagram illustrating an example operational architecture for asynchronously directing a spreadsheet application service to perform computationally expensive spreadsheet tasks, according to some embodiments.

FIG. 9 depicts a block diagram illustrating an example operational architecture 900 for asynchronously directing a spreadsheet app service 125 to perform computationally expensive spreadsheet tasks, according to some embodiments. Example operational architecture 900 is similar to example operational architecture 100 of FIG. 1 and includes many of the same components except that spreadsheet app service 125 is further configured to offload at least a portion of the execution of the computationally expensive spreadsheet task to a distributed computing framework 160.

The distributed computing framework 160 can be any cloud-based or central processing system capable of performing the job given the data from the one or more spreadsheets and an instruction directing the spreadsheet application service to asynchronously execute the computationally expensive spreadsheet task.

FIG. 10 illustrates computing system 1001, which is representative of any system or collection of systems in which the various applications, services, scenarios, and processes disclosed herein may be implemented. For example, computing system 1001 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 1001 may be implemented as a single apparatus, system, or device or may be implemented in a distributed manner as multiple apparatuses, systems, or devices. Computing system 1001 includes, but is not limited to, processing system 1002, storage system 1003, software 1005, communication interface system 1007, and user interface system 1009. Processing system 1002 is operatively coupled with storage system 1003, communication interface system 1007, and an optional user interface system 1009.

Processing system 1002 loads and executes software 1005 from storage system 1003. When executed by processing system 1002 for deployment of scope-based certificates in multi-tenant cloud-based content and collaboration environments, software 1005 directs processing system 1002 to operate as described herein for at least the various processes, operational scenarios, and sequences discussed in the foregoing implementations. Computing system 1001 may optionally include additional devices, features, or functionality not discussed for purposes of brevity.

Referring still to FIG. 10, processing system 1002 may comprise a micro-processor and other circuitry that retrieves and executes software 1005 from storage system 1003. Processing system 1002 may be implemented within a single processing device, but may also be distributed across multiple processing devices or sub-systems that cooperate in executing program instructions. Examples of processing system 1002 include general purpose central processing units, application specific processors, and logic devices, as well as any other type of processing device, combinations, or variations thereof.

Storage system 1003 may comprise any computer readable storage media readable by processing system 1002 and capable of storing software 1005. Storage system 1003 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1003 may also include computer readable communication media over which at least some of software 1005 may be communicated internally or externally. Storage system 1003 may be implemented as a single storage device, but may also be implemented across multiple storage devices or sub-systems co-located or distributed relative to each other. Storage system 1003 may comprise additional elements, such as a controller, capable of communicating with processing system 1002 or possibly other systems.

Software 1005 may be implemented in program instructions and among other functions may, when executed by processing system 1002, direct processing system 1002 to operate as described with respect to the various operational scenarios, sequences, and processes illustrated herein. For example, software 1005 may include program instructions for directing the system to perform the processes described with reference to FIGS. 2-5.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1005 may include additional processes, programs, or components, such as operating system software, virtual machine software, or application software. Software 1005 may also comprise firmware or some other form of machine-readable processing instructions executable by processing system 1002.

In general, software 1005 may, when loaded into processing system 1002 and executed, transform a suitable apparatus, system, or device (of which computing system 1001 is representative) overall from a general-purpose computing system into a special-purpose computing system. Indeed, encoding software on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage, as well as other factors.

For example, if the computer readable storage media are implemented as semiconductor-based memory, software 1005 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 1007 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 1009 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1009. In some cases, the input and output devices may be combined in a single device, such as a display capable of displaying images and receiving touch gestures. The aforementioned user input and output devices are well known in the art and need not be discussed at length here. In some cases, the user interface system 1009 may be omitted when the computing system 1001 is implemented as one or more server computers such as, for example, blade servers, rack servers, or any other type of computing server system (or collection thereof).

User interface system 1009 may also include associated user interface software executable by processing system 1002 in support of the various user input and output devices discussed above. Separately or in conjunction with each other and other hardware and software elements, the user interface software and user interface devices may support a graphical user interface, a natural user interface, or any other type of user interface, in which a user interface to a productivity application may be presented.

Communication between computing system 1001 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method, executing on a computing device, of operating a spreadsheet application for directing a remote service to asynchronously execute a spreadsheet task that performs a calculation pertaining to a data set within a spreadsheet, the method comprising:
    generating a job including:
        data from the spreadsheet of the spreadsheet application identifying the spreadsheet task and an instruction directing the remote service to asynchronously execute the spreadsheet task on behalf of the spreadsheet application;
    sending, to the remote service, a request to perform the job;
    responsive to sending the request, receiving, from the remote service, a persistent job identifier (ID) created by a job execution registry component of the remote service, wherein the persistent job ID is a tracking identifier of the job, specific to the remote service, that is usable by the spreadsheet application to access a state of execution of the job within the remote service; and
    embedding the persistent job ID in the spreadsheet.

2. The method of claim 1, further comprising:
    generating a job result retrieval request that requests a result of execution of the job from the remote service, wherein the job result retrieval request includes the persistent job ID;
    sending the job result retrieval request for delivery to the remote service; and
    integrating the results of the spreadsheet task into the spreadsheet.

3. The method of claim 2, wherein the job result retrieval request includes an indication of a type of client running a spreadsheet application or a type of the spreadsheet application, and wherein the result of execution of the job is formatted in accordance with the type of client running the spreadsheet application or a type of the spreadsheet application.

4. The method of claim 1, further comprising:
    periodically receiving, from the remote service, an update to a status of execution of the job; and
    rendering the update to the status in a graphical user interface of the spreadsheet application that displays the spreadsheet.

5. The method of claim 4, wherein the update to the status is received responsive to sending a request for the status to the remote service, and wherein the request for the update to the status includes the persistent job ID.

6. The method of claim 4, wherein rendering of the update to the status comprises rendering the update in a status bar along with a status of other offloaded spreadsheet tasks.

7. The method of claim 1, further comprising:
accessing, from a central or cloud-based collaboration or content service, a spreadsheet workbook that comprises a plurality of spreadsheets including the spreadsheet, and wherein the persistent job ID is stored in a cell of the spreadsheet and a result of execution of the spreadsheet task is stored in at least one cell of another spreadsheet of the plurality of spreadsheets.

8. The method of claim 1, wherein the embedding of the persistent job ID in the spreadsheet comprises embedding the persistent job ID as a link enabling access to results of executing the spreadsheet task via the remote service.

9. The method of claim 1, further comprising: determining that the spreadsheet task exceeds a computational processing requirement threshold for executing the spreadsheet task using the spreadsheet application, and wherein the request to perform the job is sent to the remote service based on the determining that the spreadsheet task exceeds the computational processing requirement threshold.

10. A system comprising:
at least one processor; and
a memory, operatively connected with the at least one processor, storing computer-executable instructions that, when executed by the at least one processor, causes the at least one processor to execute a method that comprises:
generating a job including:
data from a spreadsheet of a spreadsheet application that identifies a spreadsheet task and an instruction directing a remote service to asynchronously execute the spreadsheet task that performs, on behalf of the spreadsheet application, a calculation pertaining to a data set within the spreadsheet,
sending, to the remote service, a request to perform the job,
responsive to sending the request, receiving, from the remote service, a persistent job identifier (ID) created by a job execution registry component of the remote service, wherein the persistent job ID is a tracking identifier of the job, specific to the remote service, that is usable by the spreadsheet application to access a state of execution of the job within the remote service, and
embedding the persistent job ID in the spreadsheet.

11. The system of claim 10, wherein the embedding of the persistent job ID in the spreadsheet comprises embedding the persistent job ID as a link enabling access to results of executing the spreadsheet task via the remote service.

12. The system of claim 10, wherein the method, executed by the at least one processor, further comprises: determining that the spreadsheet task exceeds a computational processing requirement threshold for executing the spreadsheet task using the spreadsheet application, and wherein the request to perform the job is sent to the remote service based on the determining that the spreadsheet task exceeds the computational processing requirement threshold.

13. The system of claim 10, wherein the method, executed by the at least one processor, further comprises:
generating a job result retrieval request that requests a result of execution of the job from the remote service, wherein the job result retrieval request includes the persistent job ID,
sending the job result retrieval request for delivery to the remote service, and
integrating the results of the spreadsheet task into the spreadsheet.

14. The system of claim 10, wherein the spreadsheet is part of a spreadsheet workbook that comprises a plurality of spreadsheets, and wherein the persistent job ID is stored in a cell of the spreadsheet and a result of execution of the spreadsheet task is stored in at least one cell of another spreadsheet of the plurality of spreadsheets.

15. A computer storage device storing computer-executable instructions that, when executed by at least one processor, causes the at least one processor to execute a method comprising:
generating a job including:
data from a spreadsheet of a spreadsheet application that identifies a spreadsheet task and an instruction directing a remote service to asynchronously execute the spreadsheet task that performs, on behalf of the spreadsheet application, a calculation pertaining to a data set within the spreadsheet,
sending, to the remote service, a request to perform the job,
responsive to sending the request, receiving, from the remote service, a persistent job identifier (ID) created by a job execution registry component of the remote service, wherein the persistent job ID is a tracking identifier of the job, specific to the remote service, that is usable by the spreadsheet application to access a state of execution of the job within the remote service, and
embedding the persistent job ID in the spreadsheet.

16. The computer storage device of claim 15, wherein the embedding of the persistent job ID in the spreadsheet comprises embedding the persistent job ID as a link enabling access to results of executing the spreadsheet task via the remote service.

17. The computer storage device of claim 15, wherein the method, executed by the at least one processor, further comprising: determining that the spreadsheet task exceeds a computational processing requirement threshold for executing the spreadsheet task using the spreadsheet application, and wherein the request to perform the job is sent to the remote service based on the determining that the spreadsheet task exceeds the computational processing requirement threshold.

18. The computer storage device of claim 15, wherein the method, executed by the at least one processor, further comprising:
generating a job result retrieval request that requests a result of execution of the job from the remote service, wherein the job result retrieval request includes the persistent job ID;
sending the job result retrieval request for delivery to the remote service; and
integrating the results of the spreadsheet task into the spreadsheet.

19. The computer storage device of claim 15, wherein the spreadsheet is part of a spreadsheet workbook that comprises a plurality of spreadsheets, and wherein the persistent job ID is stored in a cell of the spreadsheet and a result of execution of the spreadsheet task is stored in at least one cell of another spreadsheet of the plurality of spreadsheets.

20. The method of claim 1, wherein the embedding further comprises embedding, in the spreadsheet, a status bar indicating a progress of the job by the remote service, and wherein the status bar is a temperature indicator providing one or more colors indicating a completion state of the job.

* * * * *